(12) United States Patent
Agrawal et al.

(10) Patent No.: US 11,316,684 B2
(45) Date of Patent: Apr. 26, 2022

(54) RESTRICTING SECURITY KEY TRANSFER FROM A KEY MANAGEMENT SERVER IN AN ENTERPRISE

(71) Applicant: International Business Machines Corporation, Armonk, NY (US)

(72) Inventors: Mohit Niranjan Agrawal, Kothrud (IN); Vinod A. Valecha, Pune (IN); Sanjay B. Panchal, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/877,539

(22) Filed: May 19, 2020

(65) Prior Publication Data

US 2021/0367768 A1    Nov. 25, 2021

(51) Int. Cl.
*H04L 9/08* (2006.01)
*G06F 21/62* (2013.01)
*G06F 21/60* (2013.01)

(52) U.S. Cl.
CPC .......... *H04L 9/088* (2013.01); *G06F 21/6209* (2013.01); *G06F 2221/2111* (2013.01)

(58) Field of Classification Search
CPC .................. H04L 9/088; G06F 21/6209; G06F 2221/2111
See application file for complete search history.

(56) References Cited

U.S. PATENT DOCUMENTS

| | | | |
|---|---|---|---|
| 7,443,986 B2 | 10/2008 | Takata et al. | |
| 8,972,589 B2 | 3/2015 | Roese et al. | |
| 9,591,553 B1 | 3/2017 | Syed et al. | |
| 10,491,603 B1* | 11/2019 | Robinson | H04L 63/20 |
| 10,742,421 B1* | 8/2020 | Wentz | H04L 9/0897 |
| 2002/0051540 A1* | 5/2002 | Glick | H04L 63/1408 380/258 |
| 2003/0225893 A1* | 12/2003 | Roese | H04L 69/329 709/227 |
| 2008/0022003 A1* | 1/2008 | Alve | G01S 5/0009 709/229 |
| 2012/0159156 A1* | 6/2012 | Barham | G06F 21/604 726/4 |
| 2012/0275598 A1* | 11/2012 | Vimpari | H04L 9/088 380/255 |
| 2013/0044878 A1 | 2/2013 | Rich et al. | |

(Continued)

*Primary Examiner* — Darren B Schwartz

(74) *Attorney, Agent, or Firm* — Jeffrey S. LaBaw; David H. Judson

(57) ABSTRACT

An enterprise key management server operates in association with a location service that maintains information defining at least one physical boundary of the enterprise. Upon receipt at the key management server of a request that requires release of key material, an additional security check is performed. When the request is received from a GPS-enabled storage device, the key management server queries the location service to determine whether that device is within the boundary. If so, the key material is released. If the requesting device does not provide its location, or if the location service determines that the device is not within the boundary, the key management server fails the request so that the key material is not released. In this manner, the disclosure of the key material to a device that is no longer within the confines of the enterprise, e.g., because it has been stolen, is averted.

17 Claims, 5 Drawing Sheets

(56) References Cited

U.S. PATENT DOCUMENTS

| | | | | |
|---|---|---|---|---|
| 2013/0232542 | A1* | 9/2013 | Cheng | H04L 63/20 |
| | | | | 726/1 |
| 2013/0246465 | A1* | 9/2013 | Cambridge | H04W 12/08 |
| | | | | 707/E17.005 |
| 2013/0347058 | A1* | 12/2013 | Smith | G06F 21/57 |
| | | | | 726/1 |
| 2015/0058913 | A1* | 2/2015 | Kandasamy | H04L 63/20 |
| | | | | 726/1 |
| 2015/0101012 | A1* | 4/2015 | White | G06F 16/245 |
| | | | | 726/1 |
| 2015/0106900 | A1* | 4/2015 | Pinski | H04W 12/068 |
| | | | | 726/7 |
| 2015/0188949 | A1* | 7/2015 | Mahaffey | H04W 12/37 |
| | | | | 726/1 |
| 2015/0271154 | A1* | 9/2015 | Ronca | H04L 9/3268 |
| | | | | 713/168 |
| 2015/0271156 | A1* | 9/2015 | Ronca | H04L 9/0872 |
| | | | | 713/168 |
| 2015/0373030 | A1 | 12/2015 | Bank et al. | |
| 2016/0300070 | A1* | 10/2016 | Durham | H04L 63/06 |
| 2017/0054760 | A1 | 2/2017 | Barton et al. | |
| 2018/0191695 | A1* | 7/2018 | Lindemann | H04L 63/0853 |
| 2019/0222567 | A1* | 7/2019 | Caldera | H04L 63/0823 |
| 2021/0243199 | A1* | 8/2021 | Turner | H04L 9/0891 |

* cited by examiner

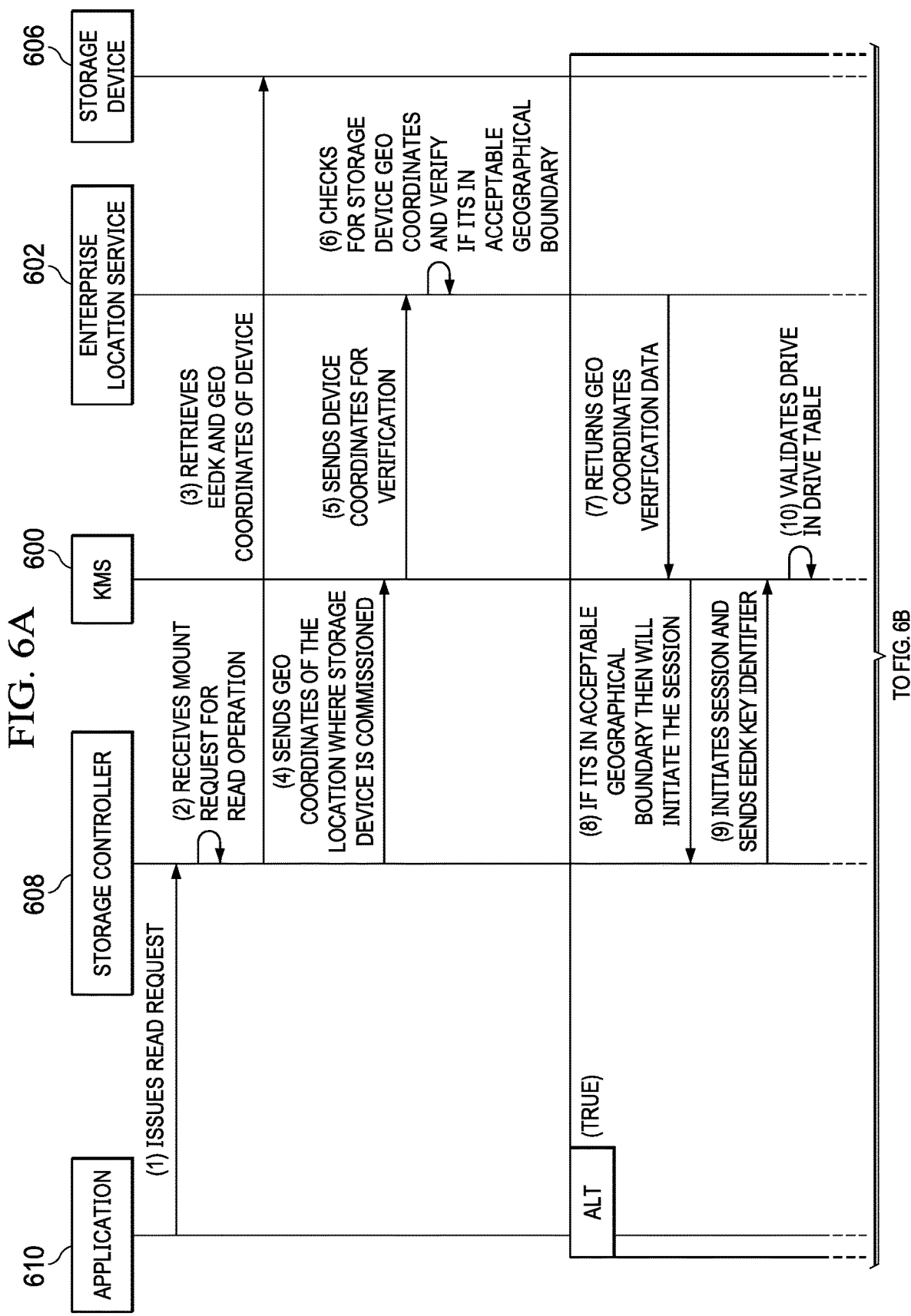

RESTRICTING SECURITY KEY TRANSFER FROM A KEY MANAGEMENT SERVER IN AN ENTERPRISE

BACKGROUND OF THE INVENTION

Technical Field

This disclosure relates generally to cryptographic key lifecycle management.

Background of the Related Art

Business data is growing at exponential rates, and along with that growth is a demand for securing that data. Enterprises have responded by implementing encryption at various layers, such as in hardware, on the network, and in various applications. This response has resulted in a series of encryption silos, some of which hold confidential customer data, with fragmented approaches to security, keys and coverage. Further, different applications across the enterprise often employ different encryption methods. Thus, for example, some departments in the organization may use public-key cryptography while others use secret-key or hashes. Still others do not encrypt data while it is at rest (such as when it is stored on a device or in a database) but only when the data is in motion, using virtual private networks (VPNs) to secure the data pipeline. Key management for these encryption approaches is often similarly fragmented. Sometimes key management is carried out by department teams using manual processes or embedded encryption tools. Other times, the key management function is centrally managed and executed. In some cases, no formal key management process is in place. This fragmented approach to key management can leave the door open for loss or breach of sensitive data.

Key Management Interoperability Protocol (KMIP) is a known standard for key management sponsored by the Organization for the Advancement of Structured Information Standards (OASIS). It is designed as a comprehensive protocol for communication between enterprise key management servers and cryptographic clients (e.g., from a simple automated device to a sophisticated data storage system). By consolidating key management in a single key management system that is KMIP-compliant, an enterprise can reduce its operational and infrastructure costs while ensuring appropriate operational controls and governance of security policy.

While known key management techniques and protocols provide significant advantages, enterprises that implement these technologies often have a large number of storage devices within their premises but located at different locations around the globe. Some of these devices are self-encrypting storage devices that encrypt data before writing. Typically, key management servers keep a list of registered devices or otherwise track them through device Internet Protocol (IP) addresses or their configured digital certificates. That said, in the above-described approaches the key management servers do not track the exact location of the devices. As a consequence, there is a threat of a device that is being managed by the key management server—while still continuing to communicate with the enterprise key management server—to be stolen and then leveraged for some nefarious purpose, such as an insider attack.

The technique of this disclosure addresses this security threat.

BRIEF SUMMARY

An enterprise key management server is augmented to perform an additional security check before releasing key material to a requesting device, such as network-attached storage. In this approach, network-attached storage devices preferably incorporate Global Positioning System (GPS) technologies such that the physical location of the devices relative to the physical confines of the enterprise may be determined. The key management server operates in association with an enterprise location service (ELS) that maintains information that defines one or more physical boundaries of the enterprise. Upon receipt at the key management server of a request that requires release of the key material in order to be serviced, the additional security check is performed. When the request is received from a GPS-enabled storage device, the key management server queries the enterprise location service to determine whether the device is within at least one physical boundary. If so, the key management server continues to service the original request, e.g., by releasing or enabling release of the key material required. When, however the requesting device does not provide its location, or when the enterprise location service determines that the device is not within the at least one physical boundary, a given action is taken. Typically, the given action fails the request so that the key material is not released. In this manner, the additional security check ensures against inadvertent disclosure of the key material to a network-attached device that is no longer within the confines of the enterprise, e.g., because it has been stolen.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject disclosure and the advantages thereof, reference is now made to the following descriptions taken in conjunction with the accompanying drawings, in which:

FIGS. 6A and 6B together are a sequence diagram depicting how a key management server enforces a policy that restricts access to that server (e.g., to obtain key material) to storage devices that are determined to be located within an enterprise geographic boundary according to an embodiment.

DETAILED DESCRIPTION

Figure 1:
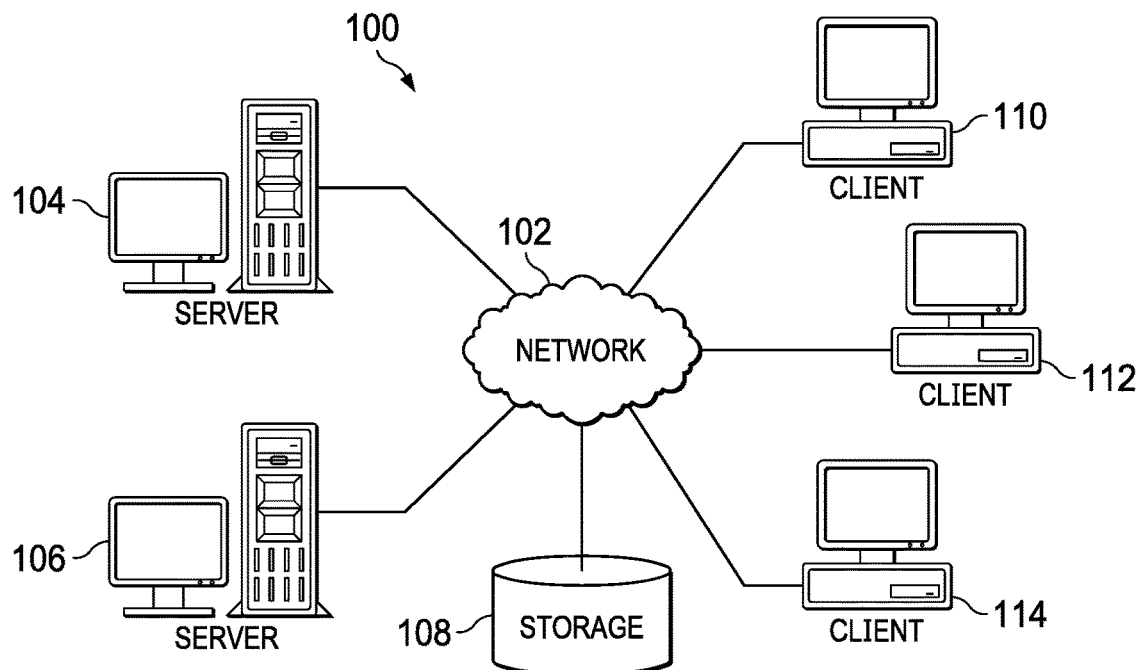
FIG. 1 depicts an exemplary block diagram of a distributed data processing environment in which exemplary aspects of the illustrative embodiments may be implemented.
Figure 2:
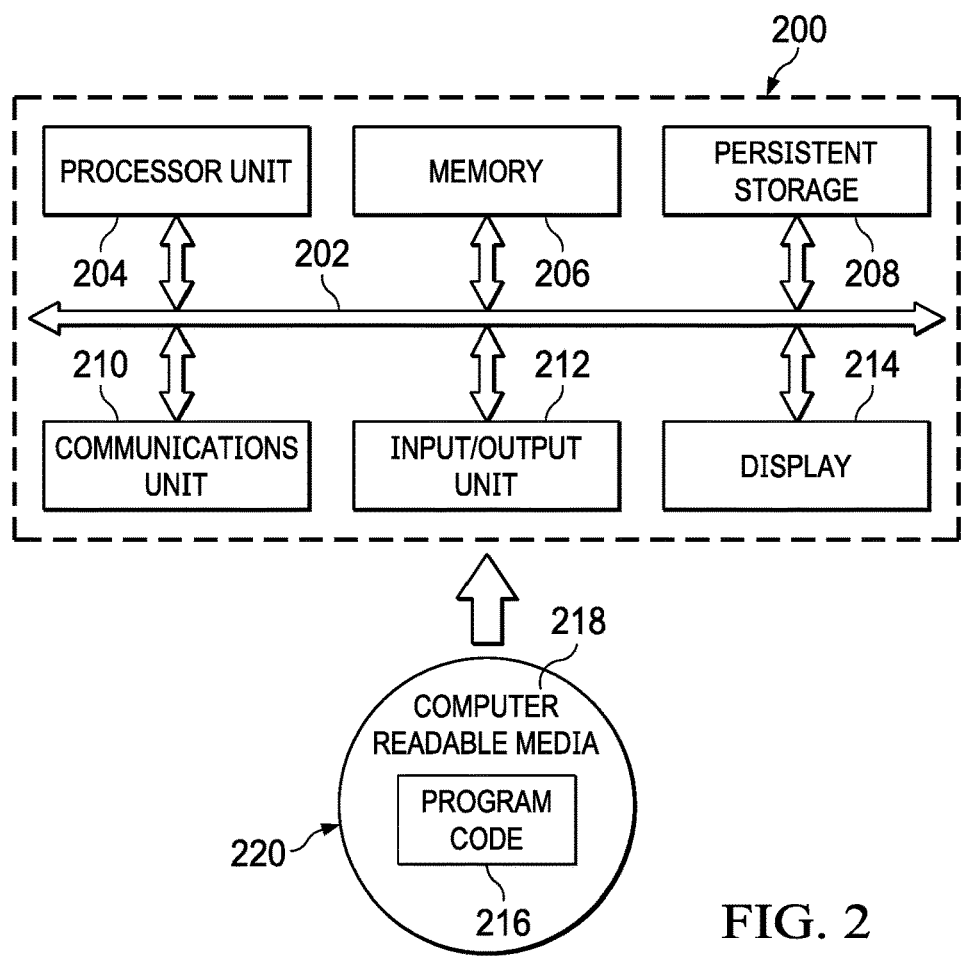
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides the clients data, such as boot files, operating system images, and applications. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Key Management Interoperability Protocol (KMIP)

Figure 3:
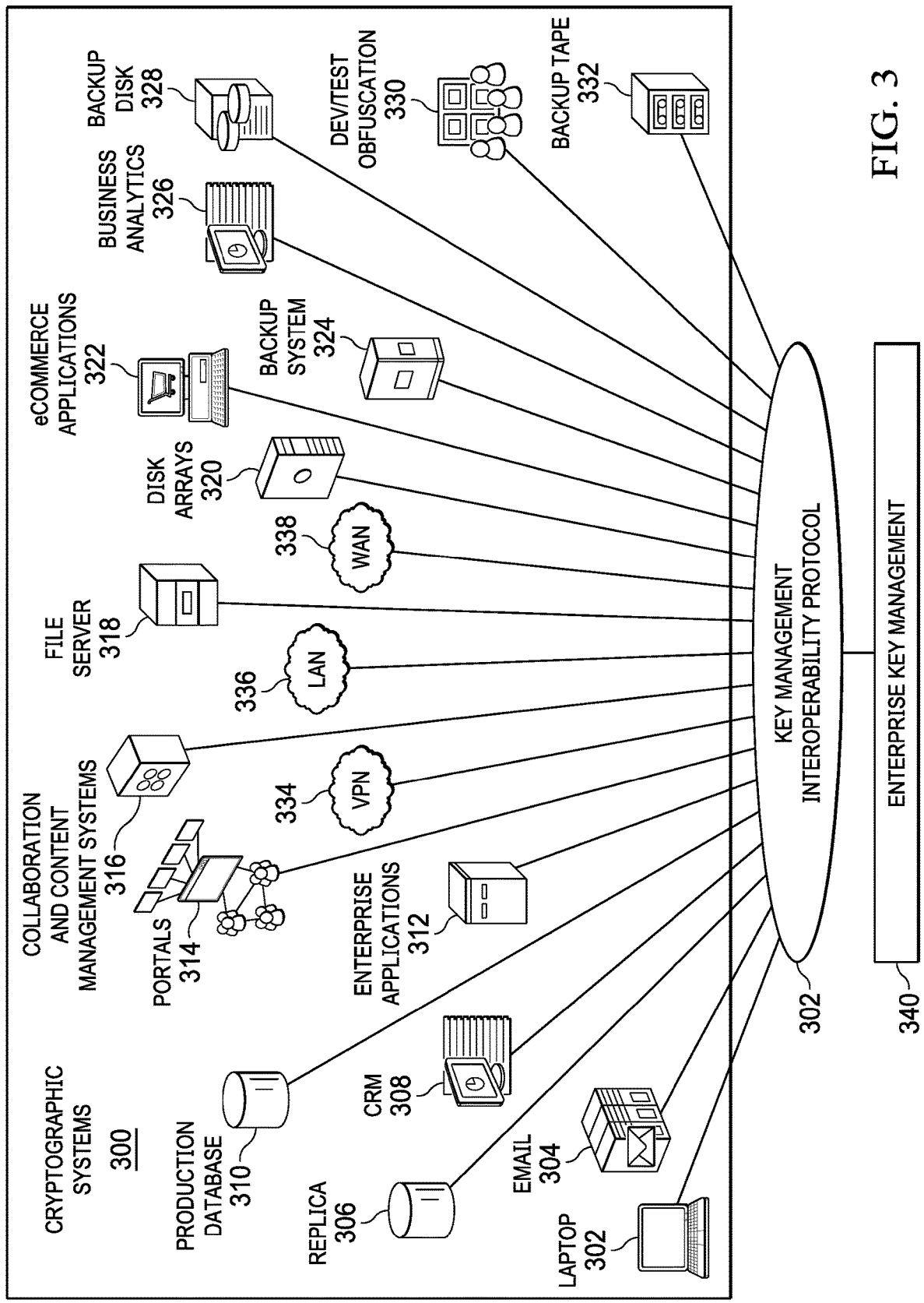
FIG. 3 is a representative enterprise environment in which the Key Management Interoperability Protocol (KMIP) is implemented.

As described above, the Key Management Interoperability Protocol (KMIP) enables key lifecycle management by defining a protocol for encryption client and key management server communication. Key lifecycle operations supported by the protocol include generation, submission, retrieval and deletion of cryptographic keys. Generally, KMIP enables cryptographic clients to communicate via a single protocol to all enterprise key management servers supporting that protocol. FIG. 3 illustrates an operating environment 300 in which the Key Management Interoperability Protocol 302 is implemented to facilitate key lifecycle management in this manner. As seen in FIG. 3, the environment may be quite varied and typically includes various systems, networks, devices, applications and other resources, each of which may rely in some manner upon encryption keys. Representative enterprise elements include, without limitation, staging systems 302, email systems 304, replica storage 306, customer relationship management (CRM) systems 308, production databases 310, enterprise applications 312, portals 314, collaboration and content management systems 316, file servers 318, disk arrays 320, electronic commerce applications 322, backup systems 324, business analytics systems 326, backup disks 328, development/test systems 330, and backup tape systems 332. Data is communicated among the systems and devices over VPN 334, LAN 336, WAN 338, and other networks (not shown).

To facilitate key management, an illustrative, but non-limiting enterprise embodiment implements a key management solution 340, such as IBM® Security Key Lifecycle Manager, which in a known commercial product that executes in an application server/database server operating environment, such as on IBM WebSphere® Application Server, and DB2®. This solution is sometimes referred to herein as SKLM. The application server typically runs a Java virtual machine, providing a runtime environment for application code. The application server may also provide other services, such as communication security, logging, and Web services. The database server provides a relational database.

The key management solution 340 may be implemented within the network shown in FIG. 1 using one or more machines configured as shown in FIG. 2. An enterprise key management solution of this type enables KMIP communication with clients (such as one or more the systems illustrated) for key management operations on cryptographic material. The material includes, without limitation, symmetric and asymmetric keys, certificates, and templates used to create and control their use. The key management server 340 listens for connection requests from KMIP clients that send requests to locate, store, and manage cryptographic material on the server. Using the server 340, the enterprise manages the lifecycle of the keys and certificates. Thus, for example, among other functions, the server enables basic key serving, such as definition and serving of keys, definition of keys or groups of keys that can be associated with a device, and the like, as well as auditing functions. In a typical scenario, the server supports KMIP secret data and symmetric key interoperability profiles for KMIP server and client interactions. The server provides KMIP information, such as whether KMIP ports and timeout settings are configured, current KMIP certificate (indicating which certificate is in use for secure server or server/client communication), whether SSL/KMIP or SSL is specified for secure communication, and so forth. The server may also provide updating KMIP attributes for keys and certificates. The server 340 serves keys at the time of use to allow for centralized storage of key material in a secure location. It also includes a graphical user interface (or, in the alternative, a command line or other programmatic interface) by which administrators (or other permitted entities) centrally create, import, distribute, back up, archive and manage the lifecycle of keys and certificates. Using the interface, administrators can group devices into separate domains, defines roles and permissions, and the like. By default, typically, groups of devices only have access to encryption keys defined within their group. These role-based access control features enable separation of duties, mapping of permissions for what actions against which objects, and enforcement of data isolation and security in a multi-tenancy environment. This also enhances security of sensitive key management operations.

In operation, the management server assists encryption-enabled devices in generating, protecting, storing, and maintaining encryption keys that are used to encrypt and decrypt information that is written to and read from devices. The key management server acts as a background process waiting for key generation or key retrieval requests sent to it through a TCP/IP communication path between itself and various devices, such as a tape library, a tape controller, a tape subsystem, a device driver, or a tape drive, a disk controller, a network switch, a smart meter, and others. These are merely representative cryptographic client devices. When a client writes encrypted data, it first requests an encryption key from the key management server.

As noted above, KMIP standardizes communication between cryptographic clients that need to consume keys and the key management systems that create and manage those keys. It is a low-level protocol that is used to request and deliver keys between any key manager and any cryptographic client. KMIP uses the key lifecycle specified in NIST SP800-57 to define attributes related to key states. Network security mechanisms, such as SSL/TLS and HTTPS, are used to establish authenticated communication between the key management system and the cryptographic client.

KMIP includes three primary elements: objects, operations and attributes. Objects are the cryptographic material (e.g., symmetric keys, asymmetric keys, digital certificates and so on) upon which operations are performed. Operations are the actions taken with respect to the objects, such as getting an object from a key management system, modifying attributes of an object and so on. Attributes are the properties of the object, such as the kind of object it is, the unique identifier for the object, and so on. These include key length, algorithm, algorithm name, and the like. KMIP also envisions so-called "custom attributes" that can be used for vendor-specific support. Thus, for example, a custom attribute may be a client-side custom attribute, and the KMIP server that receives this value stores and retrieves it as necessary without attempting to interpret it. A custom attribute may also be a vendor-specific server attribute for use by the key management server.

Generalizing, a key management server is an application hosted within or in association with an enterprise and that manages cryptographic objects that are required for encryption/decryption of data on enterprise storage devices.

Restricting Security Key Material Transfer from a Key Management Server

Figure 4:
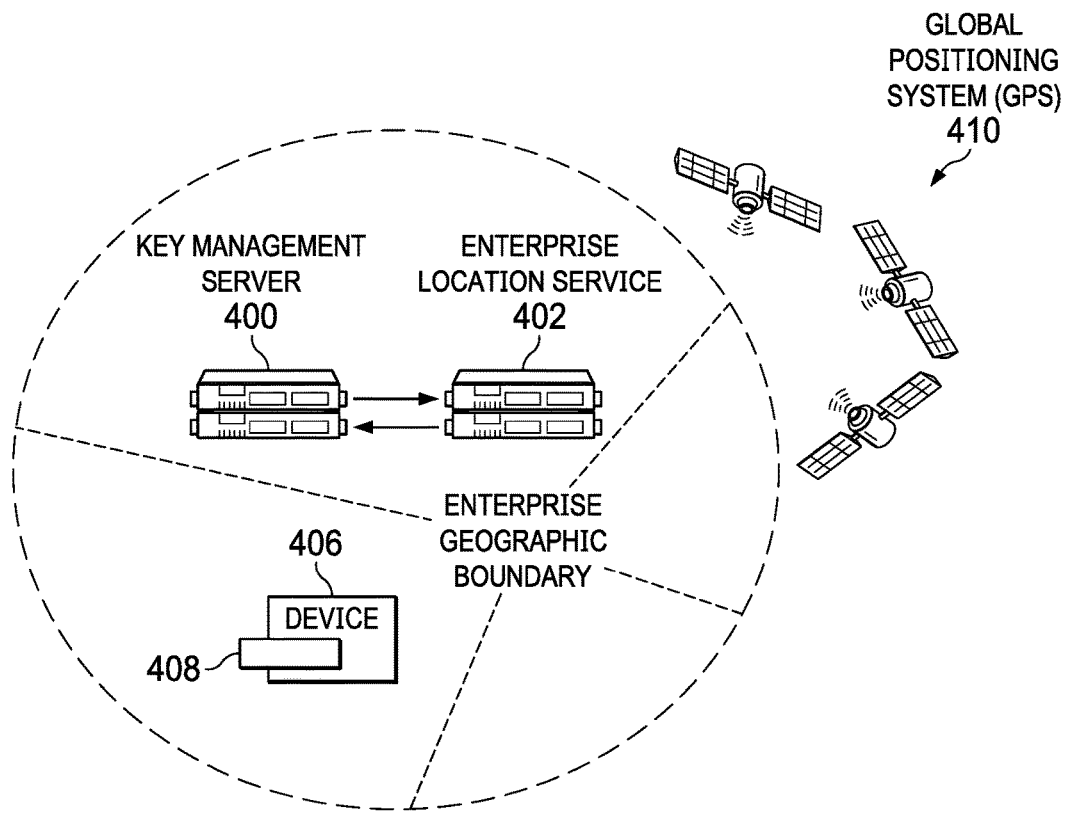
FIG. 4 depicts an enterprise key management infrastructure that is configured to incorporate an enterprise location service (ELS) according to the technique of this disclosure.

With the above as background, and with reference to FIG. 4, the technique of this disclosure is now described. In this approach, a key management server 400 in an enterprise has associated therewith an enterprise location service (ELS) 402, which maintains (or has the ability to obtain) information that defines one or more geographical boundaries of the enterprise. A representative geographic boundary 404 is depicted, and there may be one or more such boundaries. Typically, and as used herein the geographic boundary of the enterprise encompasses the physical space(s) in which devices 406 that are managed by the key management server 400 are configured/located. The device 406 typically is a storage device, such as network-attached storage. A device 406 is provisioned or otherwise configured to the key management server 400 in the manner described above, e.g., using KMIP. According to this disclosure, a device 406 may include a receiver 408 for interfacing to the Global Positioning System (GPS) 410. This type of device is sometimes referred to herein as a GPS-enabled storage device. GPS is a satellite-based radio navigation system that provides geo-location and time information to a GPS receiver anywhere on or near the Earth where there is an unobstructed line of sight to four or more GPS satellites. References herein to GPS are merely exemplary, as the receiver 408 and the location service 410 may be provided by any other similar mechanism/service that provides the geolocation and time data for the receiver. As used herein, typically an enterprise geographical boundary 404 is defined by physical location data. The nature and type of physical location data may vary along a spectrum, e.g., country, region, city, metropolitan area, address, building, building floor, office location, and so forth, and this data may be specified in any convenient manner, e.g., physical street address, latitude and longitude coordinates, zip code, DMA, or the like.

According to this disclosure, and using GPS or a similar geolocation service, the physical location of the device 406 at a point-in-time (which may be a time range) is ascertained. This information is provided to the ELS 402, which also knows or can ascertain a relevant geographic boundary 404 of the enterprise. As noted, the geographic boundary may be one of a set of geographic boundaries associated with the enterprise. According to an aspect of this disclosure, the key management server 400 is configured to determine whether a physical location of the device is within or without (external to) the enterprise geographic boundary. There may be several possible use cases, as now described.

Figure 5:
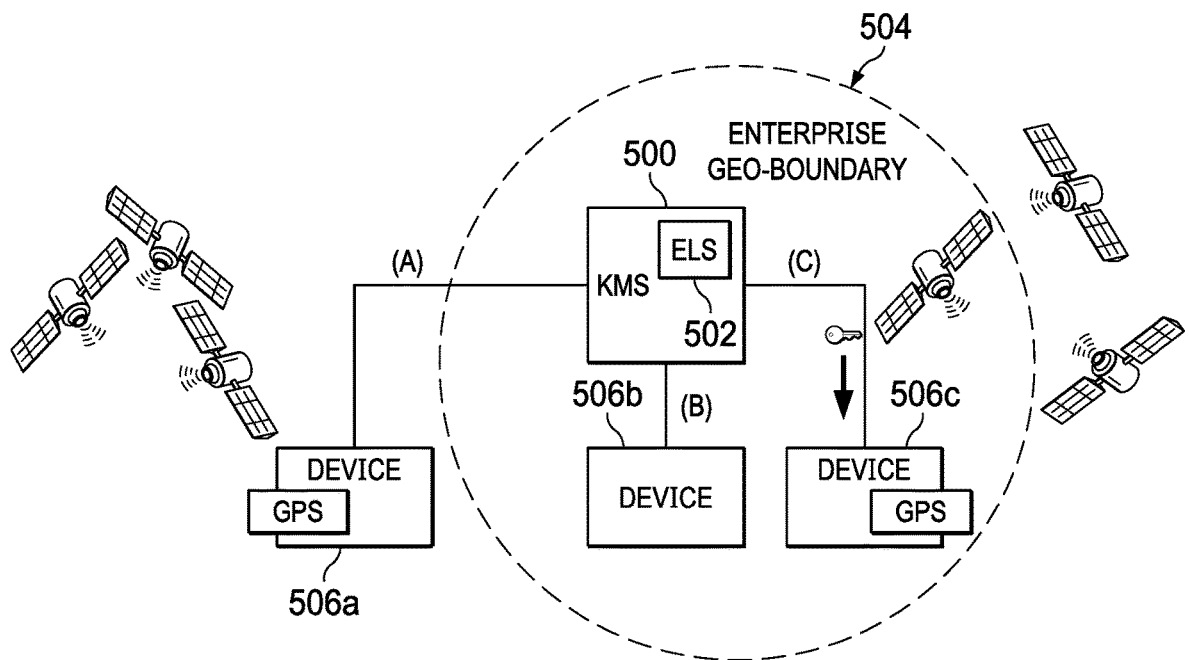
FIG. 5 depicts a representative enterprise operating environment and several use cases of the technique of this disclosure.

With reference to FIG. 5, the key management server 500 is associated with an enterprise location service 502. The ELS may be configured to operate as a component of the key management server, although typically the ELS is implemented as a distinct server/service that is accessible by one or more key management servers. In a typical use case, a device makes a request to the key management server for a security key. This operation is not intended to be limiting, as the technique herein may be implemented within the context of any interaction between a device and the KMS. According to this disclosure, and instead of responding to that request directly, the key management server 500 forwards the request to ELS 502 for evaluation. If the device is a GPS-enabled device or storage device, the request also encodes the location (at a determined point-in-time) of the device that is requesting the security key from the KMS. As used herein, the notion of forwarding the request may include actually redirecting the request or, more commonly, initiating a separate query to the ELS, identifying the request. The nature of the KMS-ELS communications may vary depending on implementation, but typically any convenient request-response protocol between these components may be used. This communication path typically is secure, e.g., via a SSL/TLS communication link. As described above, the ELS maintains or can ascertain the location data for all of the geographic boundaries of the enterprise, including boundary 504 as shown.

When the request is received by the ELS 502, ELS extracts the location information from the incoming request and checks to determine if the location is from within the trusted set of location(s) (namely, the geographic boundaries) that ELS maintains for the enterprise. Stated another way, ELS verifies if the location of the device requesting an interaction with the KMS is within the enterprise boundary in question, or is outside that boundary. The response is then passed back from the ELS to the KMS. If the requesting storage device is within the geographic boundary in question, ELS provides an affirmative indication (response) back to KMS 500, which then serves back a response to the requesting client by providing the security key. If, however, based on the location analysis the requesting storage device is not within the geographic boundary, the ELS provides a negative indication to KMS 500, which then takes a given action, e.g., declining the request for the security key, sandboxing the request, issuing a notification to an enterprise administrator to take correction action, providing some other mitigation action, etc. The nature and type of the given action may be configured by a security or other access control policy.

There may be scenarios where the ELS cannot perform a location analysis. Typically, this is because the storage device is not GPS-enabled, but it may also occur if a GPS-enabled storage device cannot provide its location for some reason. When a key request received at KMS does not include location information, preferably the KMS is configured to decline the request outright (without necessarily checking with ELS).

FIG. 5 depicts three (3) use cases. In a first use case, the storage device 506a is GPS-enabled but is located outside of the geographic boundary 504. When the request (A) is made to KMS 500, the request is validated for the location of the storage device, i.e., where the request originates from. In this use case, the location analysis does not match because the storage device 506a is outside of the enterprise boundary 504; thus, KMS 500 does not serve the request (i.e., the request results in a failed communication). In a second use case, the storage device 506b is not GPS-enabled but is located within the geographic boundary 504. When the request (B) is made to KMS, no location information is available to be passed to ELS, and thus the request also is not served. In a third use case, however, the storage device 506c is GPS-enabled and is located with the geographic boundary 504. When the request (C) is made to KMS, the ELS location analysis finds a match, and thus KMS is configured to return the requested security key (or other information depending on the request type).

Generalizing, according to this disclosure, first information that defines at least one physical boundary of the enterprise's physical environment is maintained (e.g., by the ELS). In response to receipt of a request associated with a device, a determination is made (e.g., by the KMS) that the request is associated with second information (e.g., GPS data) that identifies a physical location of the device. Upon a determination that the request is associated with the second information, the second information is compared with the first information (e.g., by the ELS) to determine whether the device is within the physical environment. Upon a determination that the device is within the physical environment, the key material is then released by the KSM for use in association with the requesting device. If, however, either (a) the request is not associated with the second information (i.e., the device is not GPS-enabled), or (b) that the device (although GPS-enabled) is not within the physical environment, a given action is taken, typically by the key management server. In a typical case, the KMS fails the request, thereby ensuring that the key material is not released, at least during the session at issue and to the device that is no longer present within the confines of the enterprise.

Figure 6B:
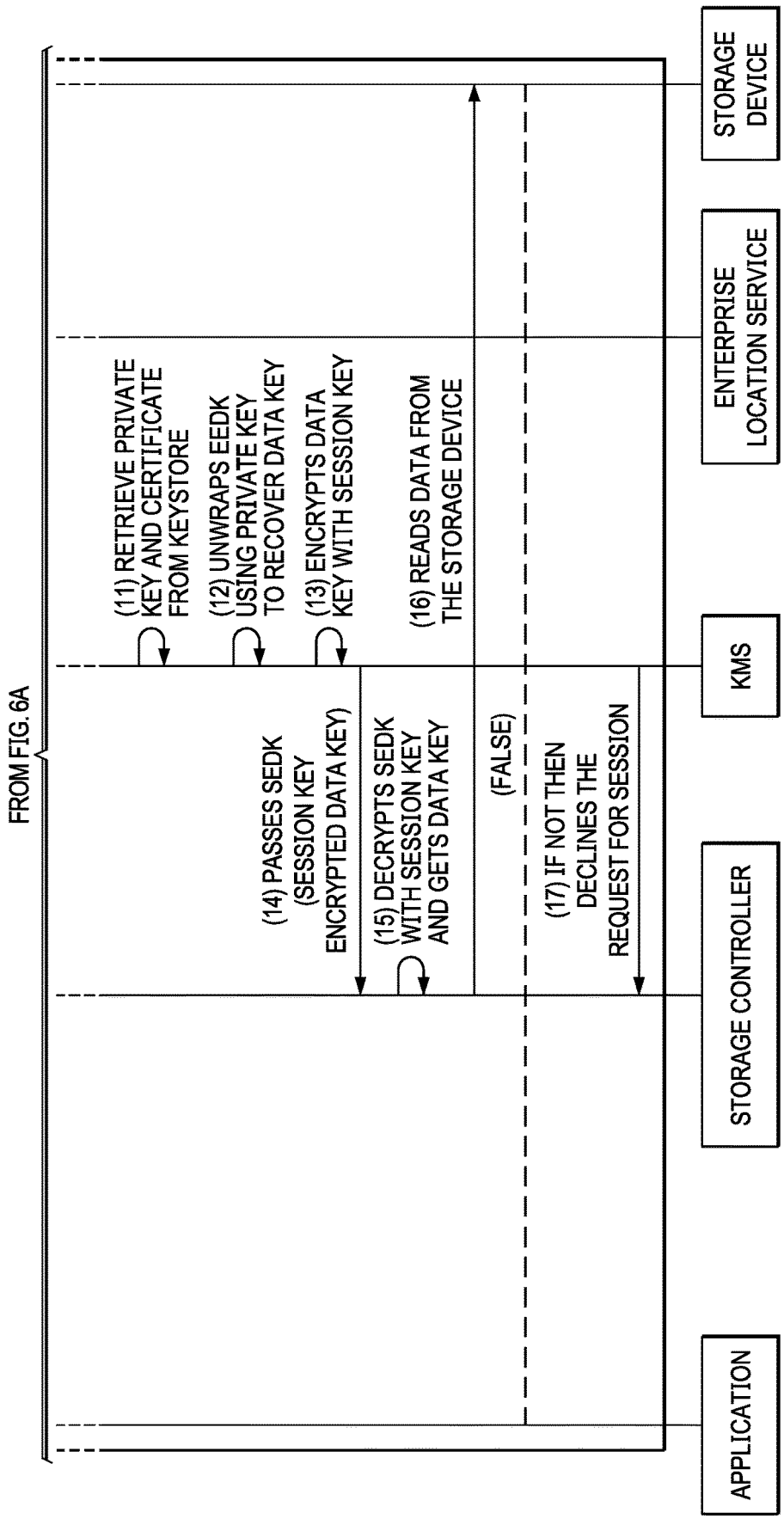

FIGS. 6A and 6B together are a sequence diagram depicting an example of this technique of this disclosure. In this example, the KMS is interfacing with a storage controller device to which the GPS-enabled storage device is initially commissioned/configured. As depicted, the enterprise computing infrastructure includes KMS 600, ELS 602 and storage device 606, all as previously described. A geographic boundary is maintained by ELS 602. Storage 606 is managed by a storage controller 608, which in turn is accessed by application 610. At step (1), and in this example scenario, application 610 issues a read request to the storage controller 608. At step (2), the storage controller receives a mount request for the required read operation. At step (3), the storage controller 608 retrieves from the storage device an externally-encrypted data key (EEDK), together with the geo-coordinates of the storage device 606, which in this example is GPS-enabled. At step (4), the storage controller 608 sends the KMS 600 the geo-coordinates of the location of where the storage device is commissioned. At step (5), KMS sends the device geo-coordinates to ELS 602 for verification. At step (6), ELS 602 checks the storage device geo-coordinates (passed via the storage controller and KMS) and verifies whether the storage device 606 is within the acceptable geographic boundary. At step (7), ELS returns to KMS geo-coordinate verification data reflecting whether the evaluation is "true" or "false." If true, at step (8) KMS instructs the storage controller 608 to initiate a session. At step (9), the storage controller 608 initiates the session and sends the KMS an EEDK key identifier. At step (10), KMS using the key identifier to validate the storage device, e.g., in a drive table list. At step (11), and if the storage device is validated, KMS retrieves from an associated keystore a private key and certificate. At step (12), KMS uses the retrieve private key to unwrap the EEDK and recover a data key. At step (13), KMS then encrypts the data key with a session key. At step (14), KMS returns to the storage controller 608 the session key-encrypted data key (SEDK). At step (15), the storage controller 608 decrypts the SEDK with the session key and obtains the data key. At step (16), and using the data key, the storage controller 608 reads the data from the storage device 606 to complete the read operation.

The "false" operation is also depicted. Here, ELS had indicated to KMS that the storage device is outside the geographic boundary. Thus, at step (17), KMS provides an indication to the storage controller that the requested read operation is denied for the session.

The technique herein provides significant advantages. Foremost, the approach ensures that storage devices, whether GPS-enabled or not, that are not located where they are supposed to within the enterprise computing infrastructure (e.g., due to theft) are unable to interact with a requesting application. Using the described technique, the key management server defines or has associated therewith a policy that restricts access to that server except from storage devices that are determined to be within a specified geographic boundary for the enterprise. Thus, whenever any registered storage device leaves the enterprise boundary (for whatever reason or cause), KMS then stops servicing requests associated with the storage device. This makes it impossible for an attacker to get its data decrypted from that stolen device. The technique ensures that even self-encrypting storage devices cannot be used outside the enterprise geo-boundary.

The acceptable geographic boundary against which the device's geo-coordinates are evaluated may vary based on additional factors, such as time-of-day, type of request, IP address range, or the like.

There may be different geographic boundaries for different devices or device types.

As noted above, a representative KMS server as depicted in FIG. 4, 5 or 6 is IBM® Security Key Lifecycle Manager or, as noted, SKLM for short, although this is not a limitation.

The ELS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

In general, KMS, ELS, the storage controller, and any storage device may be implemented as a computing device, process, program, execution thread, or the like.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques herein are not limited to use with KMIP. The technique may be used with other key management protocols including, without limitation, IPP, PKCS #11, and proprietary protocols used for key management.

The scheme described herein and the key management server may be implemented in or in conjunction with various server-side architectures including simple n-tier architectures, web portals, federated systems, cloud infrastructure, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the extended credential functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the KMIP extended credential and its components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises client-side code to generate the above-described encoding.

The KMS and its processing may be implemented as an adjunct or extension to an existing key lifecycle manager or other policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described the invention, what is now claimed is as follows:

1. A method to protect key material in an enterprise, the enterprise having a physical environment, comprising:
   maintaining first information that defines at least one physical boundary of the physical environment of the enterprise;
   responsive to receipt of a request for key material associated with a device, wherein the device is network-attached storage and the key material is maintained according to a key management protocol, determining whether the request is associated with second information that identifies a physical location of the device;
   upon a determination that the request is associated with the second information, comparing the second information with the first information to determine whether the device is within the physical environment; and
   upon a determination that the device is within the physical environment, releasing the key material for use in association with the device;
   wherein the key material is an externally-encrypted data key (EEDK), and wherein releasing the key material for use in association with the device further includes:
   retrieving a private key;
   unwrapping the EEDK using the retrieved private key to recover a data key; and
   using the data key to obtain information from the device.

2. The method as described in claim 1 wherein the physical boundary is one of: a geographic region, a geographic location within the geographic region, a physical facility with the geographic location, and a physical space associated with the physical facility.

3. The method as described in claim 1 wherein the second information is Global Positioning System (GPS) data.

4. The method as described in claim 1 further including taking a given action upon a determination either (a) that the request is not associated with the second information, or (b) that the device is not within the physical environment.

5. The method as described in claim 4 wherein the given action is one of: failing the request, flagging the request, logging the request for further evaluation, sandboxing the request, and issuing an alert.

6. The method as described in claim 1 wherein the determination that the device is within the physical environment also verifies an additional piece of data that is one of: a time of day, a type of request, and an Internet Protocol (IP) address range.

7. The method as described in claim 1 wherein the at least one physical boundary is uniquely associated with one of: the device, and a device type.

8. An apparatus associated with an enterprise, the enterprise having a physical environment, comprising:
   a hardware processor;
   computer memory holding computer program instructions executed by the hardware processor to protect key material, the computer program instructions comprising program code configured to:
   maintain first information that defines at least one physical boundary of the physical environment of the enterprise;
   responsive to receipt of a request for key material associated with a device, wherein the device is network-attached storage and the key material is maintained according to a key management protocol, determine whether the request is associated with second information that identifies a physical location of the device;
   upon a determination that the request is associated with the second information, compare the second information with the first information to determine whether the device is within the physical environment; and
   upon a determination that the device is within the physical environment, release the key material for use in association with the device;
   wherein the key material is an externally-encrypted data key (EEDK), and wherein the program code configured to release the key material for use in association with the device further includes program code configured to:
   retrieve a private key;
   unwrap the EEDK using the retrieved private key to recover a data key; and
   use the data key to obtain information from the device.

9. The apparatus as described in claim 8 wherein the physical boundary is one of: a geographic region, a geographic location within the geographic region, a physical facility with the geographic location, and a physical space associated with the physical facility.

10. The apparatus as described in claim 8 wherein the second information is Global Positioning System (GPS) data.

11. The apparatus as described in claim 8 wherein the program code is further configured to take a given action upon a determination either (a) that the request is not associated with the second information, or (b) that the device is not within the physical environment.

12. The apparatus as described in claim 11 wherein the given action is one of: failing the request, flagging the request, logging the request for further evaluation, sandboxing the request, and issuing an alert.

13. A computer program product in a non-transitory computer readable medium for use in a data processing system in an enterprise to protect key material, the enterprise having a physical environment, the computer program product holding computer program instructions that, when executed by the data processing system, are configured to:
   maintain first information that defines at least one physical boundary of the physical environment of the enterprise;
   responsive to receipt of a request for key material associated with a device, wherein the device is network-attached storage and the key material is maintained according to a key management protocol, determine whether the request is associated with second information that identifies a physical location of the device;
   upon a determination that the request is associated with the second information, compare the second information with the first information to determine whether the device is within the physical environment; and upon a determination that the device is within the physical environment, release the key material for use in association with the device;

wherein the key material is an externally-encrypted data key (EEDK), and wherein the computer program instructions configured to release the key material for use in association with the device further includes computer program instructions configured to:

retrieve a private key;

unwrap the EEDK using the retrieved private key to recover a data key; and use the data key to obtain information from the device.

14. The computer program product as described in claim 13 wherein the physical boundary is one of: a geographic region, a geographic location within the geographic region, a physical facility with the geographic location, and a physical space associated with the physical facility.

15. The computer program product as described in claim 13 wherein the second information is Global Positioning System (GPS) data.

16. The computer program product as described in claim 13 wherein the program code is further configured to take a given action upon a determination either (a) that the request is not associated with the second information, or (b) that the device is not within the physical environment.

17. The computer program product as described in claim 16 wherein the given action is one of: failing the request, flagging the request, logging the request for further evaluation, sandboxing the request, and issuing an alert.

* * * * *